(12) United States Patent
Mendiola et al.

(10) Patent No.: US 7,184,757 B2
(45) Date of Patent: Feb. 27, 2007

(54) MESSAGING SYSTEM AND METHOD THEREFOR

(75) Inventors: Dennis Mendiola, New York, NY (US); Joseph Michael C. Garrovillo, Muntinlupa (PH)

(73) Assignee: Chikka Pte Ltd., Singapore (SG)

( * ) Notice: Subject to any disclaimer, the term of this patent is extended or adjusted under 35 U.S.C. 154(b) by 30 days.

(21) Appl. No.: 10/542,742

(22) PCT Filed: Feb. 4, 2004

(86) PCT No.: PCT/SG2004/000030

§ 371 (c)(1), (2), (4) Date: Jul. 19, 2005

(87) PCT Pub. No.: WO2004/075572

PCT Pub. Date: Sep. 2, 2004

(65) Prior Publication Data

US 2006/0123078 A1    Jun. 8, 2006

(30) Foreign Application Priority Data

Feb. 18, 2003 (SG) .............................. 200300644-2

(51) Int. Cl.
*H04M 3/00* (2006.01)

(52) U.S. Cl. .................. 455/418; 455/466; 455/426.1; 370/254; 370/386; 709/205; 709/206

(58) Field of Classification Search ................ 455/418, 455/466, 426.1; 709/205, 206; 370/254, 370/286
See application file for complete search history.

(56) References Cited

U.S. PATENT DOCUMENTS

| 6,690,942 B2 * | 2/2004 | Vikman et al. .............. 455/466 |
| 6,925,079 B2 * | 8/2005 | Matsukawa .................. 370/389 |
| 7,016,700 B2 * | 3/2006 | Takahashi et al. ........ 455/550.1 |
| 2003/0021591 A1 * | 1/2003 | Grosvenor et al. ......... 386/124 |
| 2003/0126213 A1 * | 7/2003 | Betzler ........................ 709/206 |

FOREIGN PATENT DOCUMENTS

| DE | 10133519 A1 | 1/2003 |
| WO | WO 2002/47320 A1 | 6/2002 |

* cited by examiner

*Primary Examiner*—Danh Cong Le
(74) *Attorney, Agent, or Firm*—Intellectual Property Law Group LLP; Otto O. Lee; Juneko C. Jackson (57) ABSTRACT

A method of conveying information between a wireless communication device (13a) and a computer (15) providing a messaging service comprising sending a message from the wireless communication device (13a) to said computer (15), the message including an address for the computer (15), and receiving the communication at the computer (15). The address is formed by combining an Access Code (AC) uniquely identifying the computer and a Unique Identification Code (UIC) signifying; (i) a prescribed action to be performed by the computer (15); and (ii) an entity that is the subject of the prescribed action. At least one character of the address is common to both the Access Code and the Unique identification Code and the address is arranged such that said at least one common character is unified within the address such that the number of characters in the address string is less than the total number of characters in the Access Code and the Unique Identification Code.

14 Claims, 5 Drawing Sheets

MESSAGING SYSTEM AND METHOD THEREFOR

FIELD OF THE INVENTION

The invention relates to a messaging system and in particular to method of improving the accessibility of a service or content provided by a messaging system. The invention has particular, though not exclusive, utility for Short Message Service ("SMS")-based client applications and Global System for Mobile Communications ("GSM") network devices, such as mobile phones.

BACKGROUND OF THE INVENTION

The rapid growth of the mobile industry has produced a multitude of similar information, services, and applications accessible via a wireless medium. The challenge today is not so much to provide better content but rather in the improved accessibility of such content or service.

Throughout the specification, unless the context requires otherwise, the word "comprise" or variations such as "comprises" or "comprising", will be understood to imply the inclusion of a stated integer or group of integers but not the exclusion of any other integer or group of integers.

Figure 2:
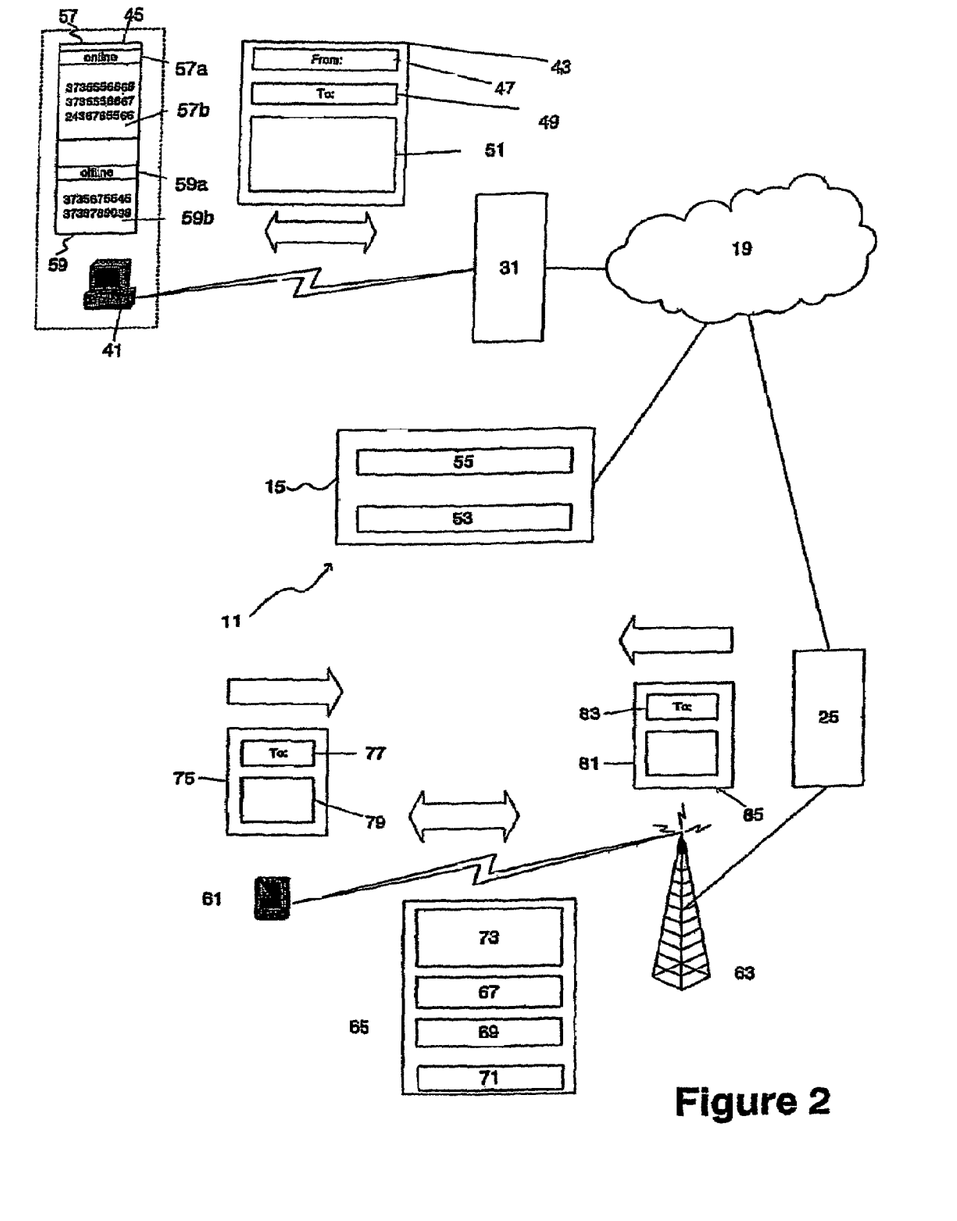
FIG. 2 is a schematic block diagram for a messaging system adapted for an instant messaging application with PC-based and GSM device type clients connected to a host server.

A messaging system is disclosed in the Applicant's prior patent Application WO-A-02/47320. FIG. 2 is schematic block diagram showing the messaging system of WO-A-02/47320 adapted for an instant messaging application with PC-based and GSM device client types connected to the host server. FIG. 2 shows a messaging system, 11, for conveying messages between a host server, 15, and a client, 13a, which is part of a GSM network. The GSM network includes an SMS facility to convey messages between its clients using a short message service centre (SMSC), 25. Each wireless client has a network identifying number (NIN) associated with it to uniquely identify the client within the GSM network. Each message comprises a message packet, 43, including the address, 49, of an intended recipient, the address, 47, of the sender of the message and the message itself, 51. The host server, 15, may be selectively connected to a plurality of different client types, 13, via the Internet, 19, to convey messages therebetween. Each client has a client identifying number (CIN) associated with it to uniquely identify it to the host server, 15. The host server, 15, and the SMSC, 25, are interconnected by the Internet, 19, or another computer network to provide for communications therebetween One of the clients, 13, of the host server, 15, is a wireless client, 13a, and has its CIN corresponding to its NIN. The host server, 15, has an access code (AC) to uniquely identify it to the SMSC, 25, and a unique identification number (UIN) ascribed to: (i) a prescribed action performed by it, and (ii) an entity that is the subject of the prescribed action. The messages sent in message packets, 43, between the host server, 15, and the wireless client, 13a, in connection with a particular prescribed action and entity includes:

(i) a combination of the AC and the UIN ascribed to the particular action and entity as the address of the host server, 15; and (ii) the NIN as the address of the wireless client.

The SMSC, 25, also uses the AC in the address of the intended recipient or the sender to recognise messages sent to or received from the host server, 15, and routs messages accordingly.

SUMMARY OF THE INVENTION

The present invention was developed to provide for the efficient and convenient communication of messages between users or clients and a host server, where the medium between one of the users and the exchange server involves wireless communications.

It is an object of the invention to allow simpler messaging, including the sending, receiving, and retrieval of content and information, and the mobile participation in transactions and services.

The invention provides a method of conveying information between a wireless communication device and a computer providing a messaging service comprising sending a message from the wireless communication device to said computer, the message including an address for the computer, receiving the communication at the computer, the address is formed by combining an Access Code (AC) uniquely identifying the computer and a Unique Identification Code (UIC) signifying (i) a prescribed action to be performed by the computer; and (ii) an entity that is the subject of the prescribed action; and wherein at least one character of the address is common to both the Access Code and the Unique Identification Code and the address is arranged such that said at least one common character is unified within the address such that the number of characters in the address string is less than the total number of characters in the Access Code and the Unique Identification Code.

The method of the invention allows the user of the wireless communication device to be presented with an apparently shorter code to be entered when accessing various services provided by a messaging service or network service provider.

The method may comprise the further steps of sending the message from the wireless communication device to a messaging server, wherein the Access Ccode uniquely identifies the computer to the messaging server which sends the message to the computer. Alternatively, the computer is a messaging server and the access code uniquely identifies a messaging service provided by the messaging server and the UIC identifies a client to which the message is to be sent.

The address may be formed by combining the Access Code and Unique Identification Code as two overlapping sets of characters and the said at least one character in common is located at the portion of the address where the two codes overlap. This embodiment is the most intuitive; however, it would be possible to arrange the address in alternative ways whilst still providing a reduced address length when compared with the combined total length of the Access Code and Unique Identification Code.

The invention also provides a system comprising a wireless communication device and a computer providing a messaging service, wherein the wireless communication device is adapted to send a message to said computer, the message including an address for the computer, the system is adapted to correctly direct the message from an address formed by combining an access code (AC) uniquely identifying the computer and a Unique Identification Code (UIC) signifying; (i) a prescribed action to be performed by the host computer; and (ii) an entity that is the subject of the prescribed action; and wherein at least one character of the address is common to both the access code and the Unique Identification Code and the address is arranged such that said at least one common character is unified within the address such that the number of characters in the address string is less than the total number of characters in the access code and the unique identification code.

BRIEF DESCRIPTION OF THE DRAWINGS

The invention will now be described in more detail and by way of example only with reference to the accompanying drawings, in which.

DETAILED DESCRIPTION OF SPECIFIC EMBODIMENTS

Figure 1:
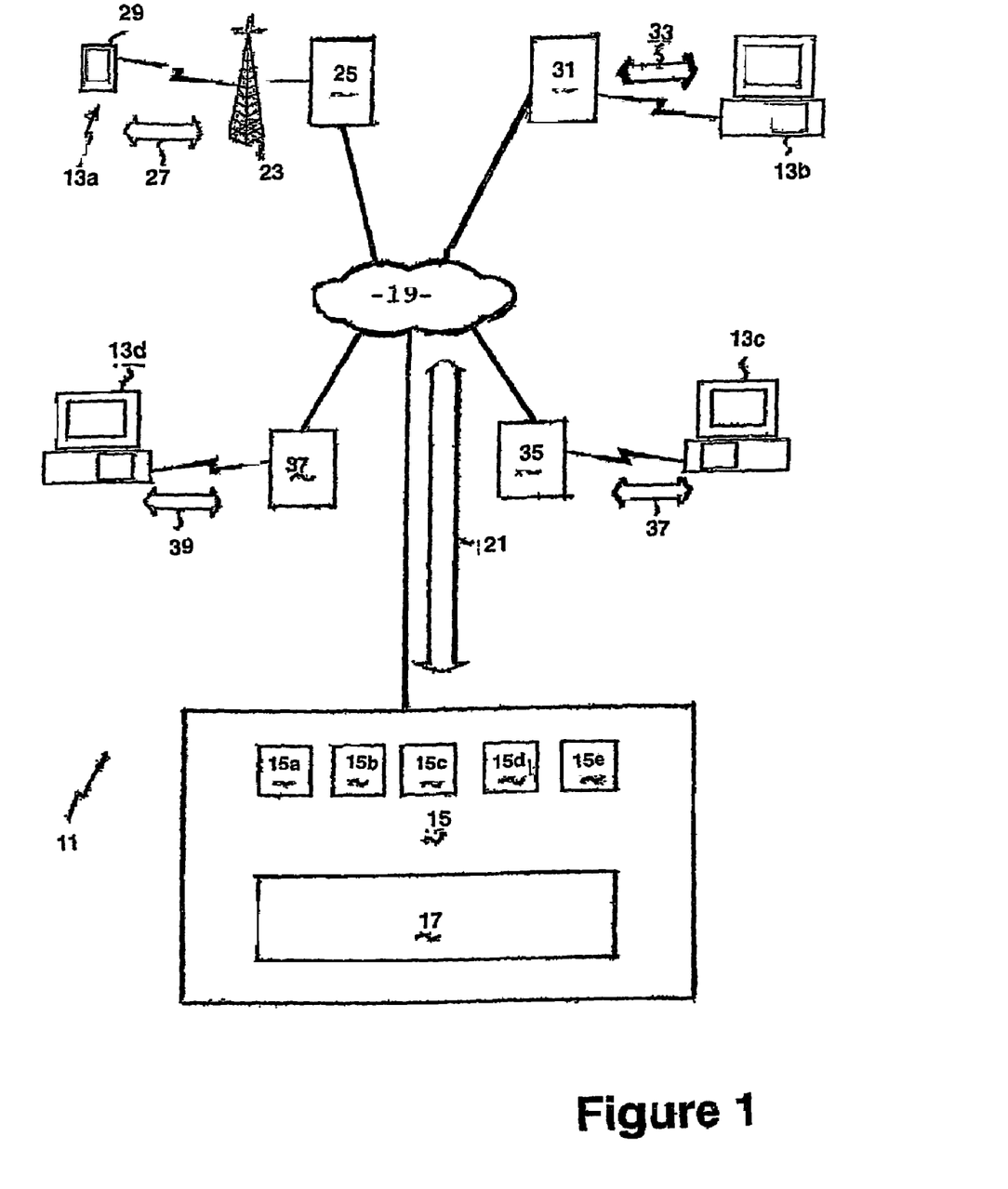
FIG. 1 is a schematic block diagram showing the general arrangement of a messaging system with different client types connected to the host server.

FIG. 1 shows an exemplary messaging system 11 in which the present invention can be used. The messaging system comprises a plurality of clients 13 of the same or different types 13a, 13b, 13c and 13d, and a host server 15. The host server 15 comprises a plurality of gateway servers 15a to 15d and a user information database 17. The gateway servers are selectively connected to each of the clients 13 via a computer network, which is in this example the Internet 19, for sending and receiving messages and commands as represented by the arrow 21 in connection with a service provided by the host server 15 to the users.

The clients 13 are selectively connected to the host server 15 via the Internet 19 when desired to utilise a particular service using any or all of the following terminals of appliances:

a GSM mobile client 13a connected via a GSM cell site 23 and SMSC server system 25, where SMS messages 27 are transmitted between a GSM device 29 of the client, such as a mobile phone, and the SMSC server system 25;

a PC-based client 13b connected via an Internet Service Provider ("ISP") 31, where message packets 33 are communicated between the PC client application of the client and the ISP 31;

an internet browser client 13c via an ISP 35, where HTML message packets 37 are conveyed between the browser client 13c and the ISP 35; and an email client 13d via an ISP 37, where email message packets 39 are communicated between the email client 13d and the ISP 37.

A client identifying number (CIN) uniquely identifies each client to the host server 15. This number is mapped to the actual address of the client and stored within the user information database 17 of the host server.

Wireless clients that are part of a wireless communication network such as GSM mobile clients 13a also have a network identifying number to uniquely identify the wireless client to the wireless communication network, in this case the GSM network of which the mobile client 13a is a member. This number is stored within the GSM network and is used by mobile clients to identify intended recipients of SMS messages sent by mobile clients and the address of the sender of such messages to the SMSC server system to effect the message transfer. In the present embodiment, the network identifying number is simply the GSM telephone number of the GSM device of the mobile client 13a.

The SMSC server system 25 controls and manages the transmission of all SMS messages between its wireless client subscribers. The SMSC server system 25 includes a database within which the network identifying numbers of all SMS subscribers are stored along with SMS message packets 27 sent by a wireless client subscriber to targeted recipients that may or may not be connected or available to the cellular network at the instant of sending. These message packets are subsequently downloaded automatically for targeted recipients when the GSM device of a recipient is switched on and is connected or otherwise available to receive messages within a cell site.

As mentioned, the host server 15 is directly connected to the SMSC server system 25 via the Internet 19 (alternatively, the SMSC server system may be connected via a direct electronic link). In this manner, messages or short messages can be sent via direct electronic or data lines through the Internet from the host server 15 to the SMSC server system 25 for subsequent delivery to subscribers of SMS on the GSM network. Short messages are sent and received between the host server 15 and the SMSC server system 25 using the GSM network's message protocol. In an embodiment, the particular protocol used is CIMD2, which is a system adopted by GSM mobile phone and network manufacturers such as Nokia (RTM) and Ericsson (RTM). The system, however, can support other protocols such as Short Message Peer-to-Peer Protocol ("SMPP").

In the exemplified messaging system the host server 15 ascribes the network identifying number of a wireless client to be the client identifying number of the messaging system. In this manner, the host server 15 is compatible with the SMSC server system 25 in its identification and addressing of wireless clients to facilitate the transfer of messages between the host server and a wireless client via the SMSC server system. However, this feature is not an essential feature of the present invention.

The access code is also ascribed to the host server 15 to uniquely identify it to the SMSC server system 25. The access code is used in messages sent between wireless clients 13a and the host server 15 so that the SMSC server system 25 can distinguish SMS messages from a wireless client that are intended to be sent to the host server 15, from other SMS messages handled by the SMSC server system that are associated with the SMS messaging service provided by it and which are not intended to be sent to the host server.

The access code effectively constitutes the address of the host server 15 from the perspective of the SMSC server system 25. In the present embodiment, the SMSC server system 25 is particularly configured to decode the access code from the first few digits of a network identifying number representing the target address or GSM telephone number of an intended recipient of an SMS message sent by a wireless client on the GSM network. The SMSC server system 25 is provided with appropriate routing software to direct any message received by it to the host server, once the access code is decoded from the network identifying number, via the Internet in the present embodiment.

A unique identification number ("UIN") is ascribed to different services provided by the host server 15 for its clients. The UIN is indicative of: (a) a prescribed action to be performed by the host server for a client, and (b) an entity that is the subject of the prescribed action.

Examples of the prescribed actions that are performed by the host server 15 include: invoking a routine on the host server associated with accessing an electronic bulletin board; invoking a routine on the host server associated with participating in a commercial transaction; invoking a routine on the host server associated with personal services; invoking a routine on the host server associated with a chat room; invoking a routine on the host server associated with transferring the message directly to another client or group of clients of the host server as specified in the message packet, which, will hereinafter be referred to as the instant messaging application.

The entities that may be the subject of the prescribed actions respectively include: the subject or topic to which the bulletin board relates; the product or service that is the subject matter of the commercial transaction; the particular type of personal service; the particular subject matter or topic of the chat room; the specific client or group of clients concerned with receiving the message.

Accordingly, different UINs are ascribed for different prescribed actions and different entities associated with the prescribed action.

In the exemplary messaging system such as that described in WO-A-02/47320, in the case of a wireless client, the UIN of a prescribed action and entity to which a message relates, is combined with the access code of the host server, to constitute the address of the host server 15. Moreover, as far as the GSM network is concerned, this combination of the access code and the UIN is the network identifying number for the host server, and is used as the intended recipient's address or effective GSM number in an SMS message intended to be sent by a wireless client to the host server. It is similarly used as the sender's address for any message sent by the host server to a wireless client in connection with any service provided by the host server to the wireless client.

An Instant Messaging Application will now be described with reference to FIGS. 2 to 4. When the UIN in a message packet received from a client indicates that an instant messaging function is to be performed by the host server 15, the host server performs the following basic actions on behalf of the user: (i) sending and (ii) receiving instant messages, and (iii) detecting users who are "online", i.e., connected to the internet or otherwise accessible by instant messaging right at, or around, that particular moment in time. Users are also referred to as "buddies" in the instant messaging (IM) scenario.

The host server 15 is specifically programmed to undertake any of the aforementioned basic actions if triggered or instructed to do so by a client accessing the host server. This triggering occurs when the client sends an electronic prompt or command in a message packet sent to the host server. For example, a GSM device will do this by sending an SMS message to the host server, an email client will do this by sending an email to the host server, a browser client will do this by sending instructions or commands to the host server via the Web, and a PC-based application will do this by sending commands to the host server via an electronic or internet link The format of the delivered information, such as the actual message or notification of who is online, necessarily depends on the appliance type. For example, with a GSM device the format will be in SMS format, with an email, it will be in email form, and with a browser client it will be in HyperText Markup Language ("HTML") form.

As the invention is primarily concerned with applications relating to wireless clients, the basic functions of the host server 15 and client 13 with respect to instant messaging will be described in the context of how they operate with respect to a GSM client. Reference should be made to WO-A-02/47320 for a description of how the basic functions operate for a PC-based client as shown in FIG. 2 of the drawings. Reference should be made to the applicant's co-pending International Application PCT/SG00/00068 for a description of how the basic functions operated with other client types.

For a GSM-based client, a GSM device 61 such as a mobile phone, is the terminal or appliance, and the user of this device operates it as a subscriber to the GSM network where telecommunications between subscribers are transmitted wirelessly through GSM cellular sites 63 disposed to create a cellular network.

A subscriber-to-subscriber SMS message on a GSM network includes a message packet 65 comprising the sender's network identifying number (NIN) (the GSM mobile phone number of the sender) 67, the target recipient's NIN (typically the GSM mobile phone number of the receiver) 69, the GSM mobile number of the SMSC server system 25 which will process the message 71, and as much as a 160-character message 73.

Sending messages from the GSM mobile device 61 to another user of the messaging system 11 is accomplished by entering an SMS message 73 in the GSM device and specifying the target recipient's NIN in the "To" address 69. The actual entry steps are specific to the GSM device manufacturer.

Importantly, the NIN address of the recipient is a combination of the numeric access code (as defined by the GSM carrier) and the target recipient's CIN. As previously described, the access code is specific to the GSM carrier and is used to indicate to the SMSC server system 25 that the SMS is to be forwarded to the host server 15.

The GSM device 61 receives instant messages via the messaging system 11 just as it would receive typical SMS messages from the GSM network's SMSC server system 25. Instant messages received by a GSM client from the host server 15 would indicate a CIN in the "From"0 or "Reply To" address 67 comprising the combination of the access code plus the CIN of the user.

It should be noted that the CIN of the recipient in the instant messaging application actually constitutes the UIN that is decoded by the host server to determine the necessary prescribed action with the appropriate entity, in this case sending the message packet as an instant message to the indicated recipient.

The IM server application 53 is designed to provide buddy online notification to GSM clients by way of SMS messages containing online buddy information. The IM server application 53 sends these messages to the GSM client 61 on triggering by a GSM client. The trigger for such a message may be automatic or manual, depending upon the specification of the user.

As shown in FIG. 2, manual triggers are accomplished by a user of a GSM device 61 sending an SMS message 75 containing a UIN designating a prescribed SMS command to the host server 15. For example, the message packet for this SMS message 75 will contain the access code of the host server 15 combined with the UIN for the prescribed "who is online command" as the NIN in the "To" address 77. The host server 15 is provided with processing means so that when it receives this SMS message containing the "who is online command" from the SMSC server system 25, it decodes the UIN to determine that it is an instant messaging application and then invokes the IM server application 53 to attend to the prescribed action. In the present instance of a manual triggering, this will involve sending back an SMS message or a series of SMS messages 81 to the sender of the message notifying or listing the CIN's, and pseudonyms if entered, of those buddies of the sender who are online. Alternatively, the message packet for this SMS message 81 may contain the CIN 83 of a particular GSM client user and a message 85 indicating that he or she is online or other message.

In the case of automatic triggering, the IM server application 53 is designed to send an SMS notification to the particular GSM client that a particular user or a group of users (buddies) are online or not, when the IM server application detects their online presence or a change in such. Accordingly, with automatic triggering, there is no prompting required by the GSM user.

The instant messaging application described works on the principle of using a single CIN/UIN to identify a user regardless of their client type and the matching of that one and only UIN to all of the client types of that user that can be handled by the host server. Thus the IM server application 53 permits the user to access their account with any of the following client types: PC based client application, GSM client, internet-browser client, and email client.

Regardless of the client type, the IM server application 53 can recognize the user, matching them to their particular CIN/UIN accordingly. From there on, the user has access to the basic functions of the IM system, such as send messages, reply to messages, receive messages, and check who is online, among other basic IM functionalities.

The manner in which this matching of CIN/UIN's to appliances and users by the IM server application 53 will now be described for the GSM device client type with reference to FIGS. 3 and 4. The manner in which this is done for other client types is described in the applicant's co-pending International Application PCT/SG00/00068.

With respect to a GSM client application provided by a GSM device 85, the IM server application 53, which in practice is run under the multiple gateway servers 15a to 15e, is connected to the SMSC server system 25 via the Internet 19. The SMSC server system 25 in turn wirelessly communicates with various GSM cellular sites 87 to establish communication with the mobile user's GSM device 85.

Figure 3:
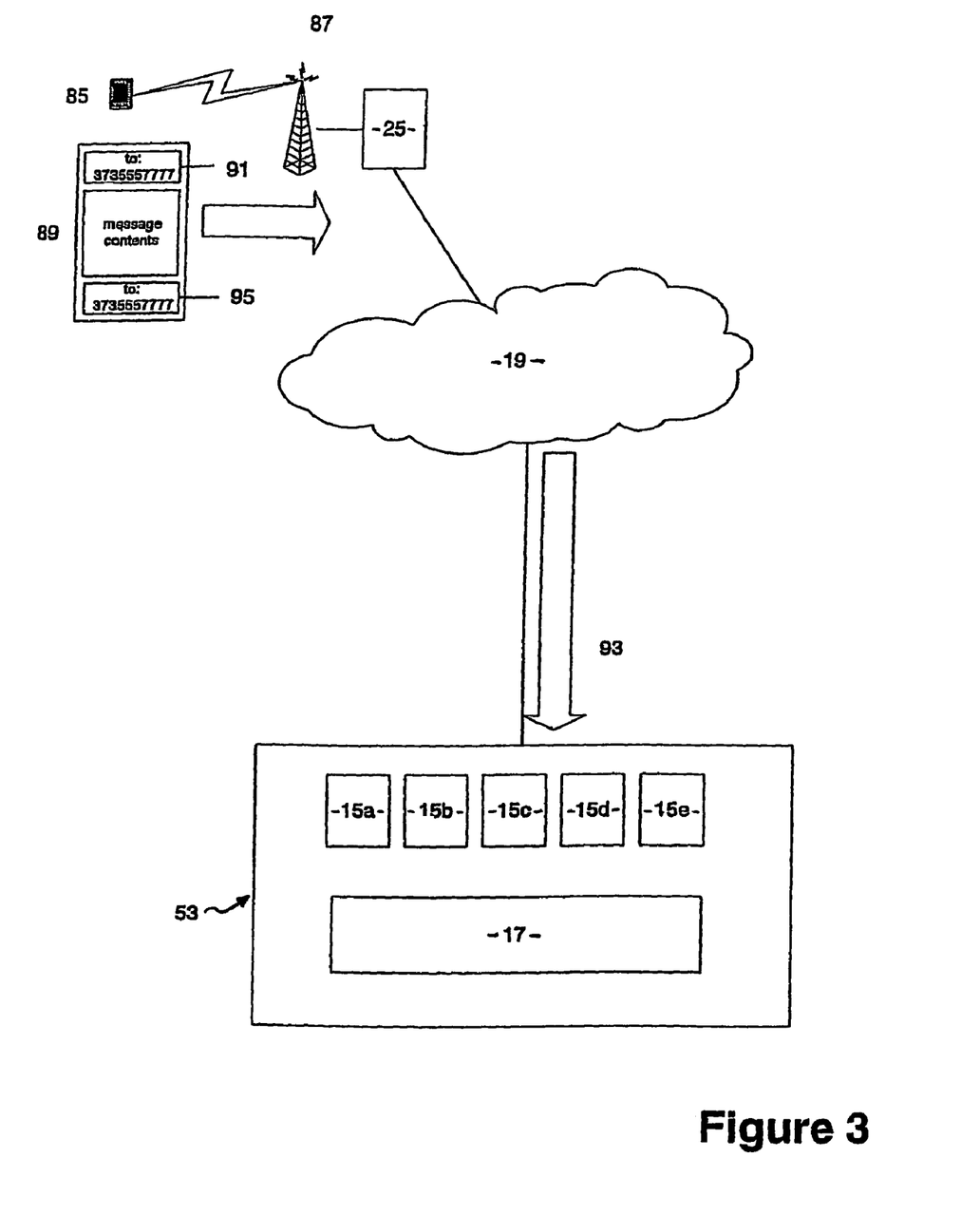
FIG. 3 is a schematic block diagram showing how a message is transmitted to the host server from a GSM device client type.

In the case of an instant message being sent from the GSM device 85 to the host server 15, as shown in FIG. 3, the SMSC server system 25 initially receives the message packet 89 from the GSM device 85 and on decoding the access code of the recipient's address in the "To" address field 91, transmits the message packet on to the host server 15 via the Internet 19. As previously mentioned, the GSM client user can send messages in message packets 89 to clients of the host server by using its local SMS, with the address formed by appending an access code (as defined by the GSM carrier) to the recipient's CIN. Notifications of buddies online are also accomplished through SMS messages sent back to the user's GSM device from the host server.

The host server 15 on receiving the message packet 89, as represented by arrow 93 then uses its processing means to match the user's (unique) CIN, which in this case is the GSM mobile phone number of the user, in the "From" address field 95 to the stored CIN of registered users of the host server in the user information database 17 to validate the CIN of the sender of the message packet and then to process the UIN extracted from the "To" address field 91 to invoke the required routine to perform the prescribed action, in this case the instant messaging application, with the specified entity. The host server in the present embodiment uses the (country code)+(area code or GSM carrier code)+(mobile phone number) to form the GSM user's CIN when the user first registers using his GSM device.

Hence, matching is straightforward since all SMS message packets include the GSM mobile number of the sender in the "From" address field 95.

On invoking the instant messaging application, the IM server application 53 determines the user status of the target recipient of the message as specified in the UIN extracted from the "To" address field 91, by accessing the user information database 17. The IM server application 53 also establishes the client types that may be accessed for the target recipient based on the user settings for that recipient stored in the user information database to ensure proper routing of the message to the selected client devices of the recipient. This essentially involves adapting the CIN of the recipient in the appropriate format of the particular client type of the user that is to be addressed by the message. In the case of the PC-based and browser-based client applications, his will simply be the UIN itself. In the case of the GSM application, it will actually be the telephone number of the target recipient, which is the UIN in any event in this example. In the case of the email-based client, it will simply be the email address of the targeted recipient. As the email address is alphanumeric, the email address is actually mapped into a numeric address.

Figure 4:
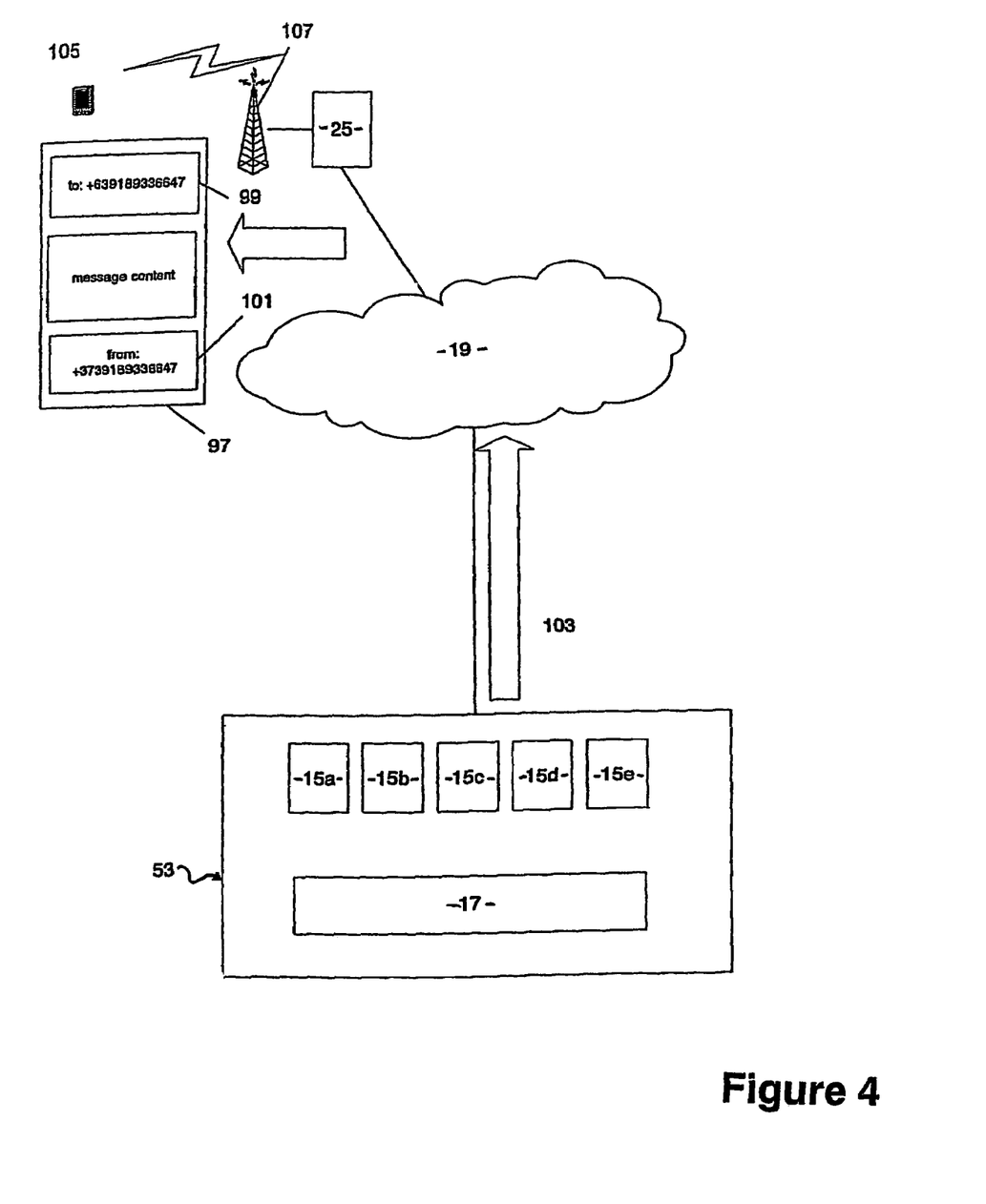
FIG. 4 is schematic block diagram showing how a message is received by a GSM device client type from a host server.
Figure 5:
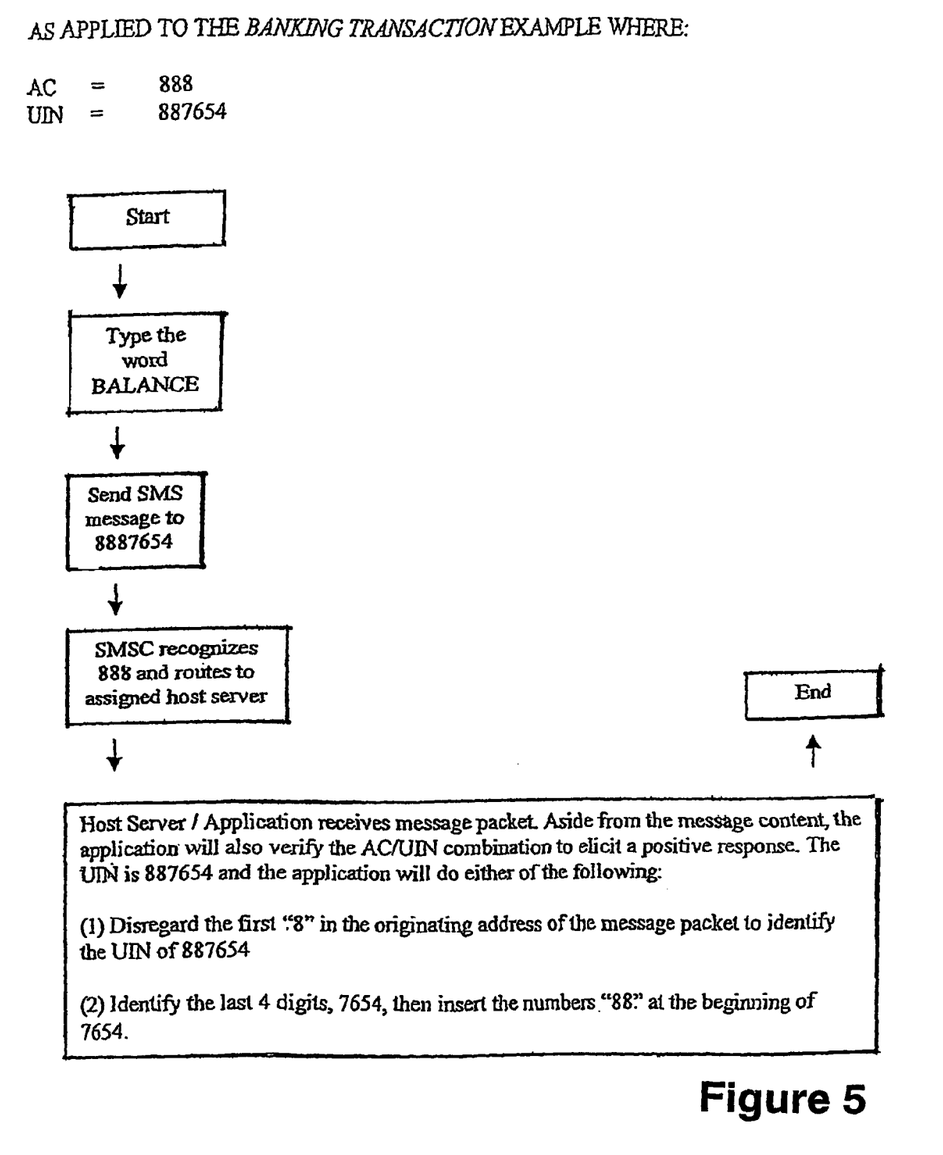
FIG. 5 is a schematic block diagram of an application according to the present invention.

In the case of the client type for the target recipient being a GSM device, the message packet 97, as shown in FIG. 4, is processed by the IM server application 53 by correctly formatting the address fields of the message packet 97 for routing to and by the SMSC server system 25 as an SMS message. The formatting involves stripping the access code from the "To" address field 99 of the message packet 97 and adding the access code to start of the CIN of the sender indicated in the "From" address field 101.

The message packet is then sent directly to the SMSC server system 25 of the GSM network via the Internet 19, as represented by the arrow 103. The GSM client user eventually receives the message packet 97 under the SMS of the GSM network when the GSM network detects the availability of the specified GSM device 105 of the user to receive messages via one of the GSM cellular sites 107.

In the specific examples shown in FIGS. 3 and 4, the user sending the message has the CIN '639189336647' and the user receiving the message has the CIN '639185556666'. The GSM client, however, needs to append the access code allocated to the host server by the SMSC server system 25, in this example '373', to the start of the CIN of the targeted recipient for dialling out through the GSM network, if the targeted GSM recipient were to reply to the message by simply "replying to" the message-i.e., the sender's NIN is automatically entered in the "sent to" numeric address.

It should be noted in all instances that the user's CIN is the user's primary identifier for the purpose of handling instant messages addressed to them or originating from them. The one-to-one matching of this UIN to the unique identifiers for each appliance creates the basic foundation for the single account system of the IM system.

A key reason for using a numeric such as the CIN is speed. This is particularly useful in accomplishing the fast transmission of instant messages with GSM devices. In order to respond to an IM message received by a GSM device user, all the sender is required to do is to click the reply button, whereupon the CIN of the sender is automatically entered into the GSM device's "reply to" address. It is envisaged that whilst in the embodiment all of the codes used are numerical, any one or more of the numbers could be replaced by alphanumeric codes.

Moreover, originating messages by the GSM device user is likewise easy and fast. All the user has to do is to enter in the "send to" address the intended recipient's CIN appended to the GSM carrier's access code. This combination access code-CIN can in fact be stored in the address books of most GSM devices, thereby facilitating fast recall of addresses and transmission of messages.

The Applicant's prior publication WO-A-02/47320 also discloses other applications of the messaging system in detail including, commercial transactions such as so-called e-commerce or on-line auctions, and an electronic bulletin board. The present invention may be used in all these applications and other applications using a wireless telecommunications device connected to a computer network such as the internet.

The Applicant's prior publication WO-A-02/47320 describes in detail the ability to combine an access code (AC) and a unique identifying number (UIN). The AC, being unique, to identify the host server to the messaging service server. The UIN, ascribed to: a prescribed action performed by the host server, and an entity that is the subject of the prescribed action.

An embodiment of the invention will now be discussed with reference to FIG. 1, in connection with a banking service provided by a host computer to a client having a wireless communications device such as a mobile or cellular phone. In the present embodiment the number 888 will be the AC while the number 887654 will be the UIN.

In the messaging system of the Applicant's prior publication WO-A-02/47320 discussed above there is no possibility of transacting directly with an AC-UIN combination independent of any prior transaction or process. If we are to take a BANKING TRANSACTION as an example where 888 is the AC assigned to the bank's host server and 887654 is the account number of John Doe, a possible prior art system might have the instruction given to bank clients as, "To access your current balance, send the word BALANCE to 888 then your account number. Ex: Send BALANCE to 888887654 (as with the case of John Doe)." In addition, given the dynamic index or suffix process that prior publication details, all transactions of John Doe will have to be centralized on 888887654. The responses that John Doe will receive, regardless of the transaction requested, will come from 888887654.

In the present invention the method and system allow for the ability to transact directly with an AC-UIN combination independent of any prior transaction or process, where at least one alphanumeric entry of the AC and the UIN are combined and treated as one allowing a shorter address or a simpler instruction in requesting for information or participating in a transaction.

If we are to take a BANKING TRANSACTION as an example where 888 is the AC assigned to the bank's host server and 887654 is the account number of John Doe, in an embodiment the instruction given to bank clients is "To access your current balance, send the word BALANCE to 8 then your account number. Ex: Send BALANCE to 8887654 (as with the case of John Doe)." The combination in the example above is seen in the overlapping of the last two digits of the AC are 88 and the first two digits of the UIN are also 88. The advantage for such a process is clear as this allows a simpler means of transaction whereby clients need not be told to send requests to 888 plus account number. Instead, they are told to send requests to 8 plus account number.

Current GSM standards do not allow single-digit access codes (AC). However, this is technically possible. Should single-digit number be publicly released, the whole range of digits starting from the single digit assigned will have to be covered as well. This limits the number of access codes available to all the world's GSM operators. Given the above statement, the process of overlapping an AC and a UIN creates an illusion to the end user. From an end-user perspective, the transaction or service is accessed via a shorter AC.

Aside from the technical and server processes required for this invention to work, as mentioned in prior publication WO-A-02/47320, there is at least one alphanumeric character, in the present embodiment at the end of the AC and the start of the UIN, that must be the same. Referring to the BANK TRANSACTION, if the bank's host server was assigned 777 as the AC and 887654 as the account number of John Doe, there is clearly no overlap. As such, the instruction will be "To access your current balance, send the word BALANCE to 777 then your account number. Ex: send BALANCE to 777887654 (as with the case of John Doe)." To improve its services, the bank can easily re-assign new account numbers to all its customers by adding 77 at the start of each account number, for the sole purpose of having an improved mobile banking service. By adding 77, the new account number of John Doe will then be 77887654 and the instruction for accessing his bank account will be, "To access your current balance, send the word BALANCE to 7 then your account number. Ex: Send BALANCE to 777887654 (as with the case of John Doe)." To improve its services, the bank can also easily re-assign new account numbers to all its customers by adding 7 at the start of each account number, for the sole purpose of having an improved mobile banking service. By adding 7, the new account number of John Doe will then be 7887654 and the instruction for accessing his bank account will be, "To access your current balance, send the word BALANCE to 77 then your account number. Ex: Send BALANCE to 777887654 (as with the case of John Doe)."

The present invention, therefore, resides primarily in the ability to transact directly with an AC-UIN combination independent of any prior transaction or process, where at least one alphanumeric entry of the AC and the UIN are combined and treated as one allowing a shorter address or a simpler instruction in requesting for information or participating in a transaction. This in turn elicits a positive response from the main application, as it is able to identify the UIN from the AC-UIN combination. The technical process is similar to that described in prior publication WO-A-02/47320, with an enhanced capability to: identify the UIN from an overlap of an AC-UIN combination by disregarding at least one alphanumeric entry, preferably the first entry in the AC or by identifying the AC and appending at least one alphanumeric entry in the UIN preferably at the start, to match that of which is positively accepted (See FIG. 1).

In an embodiment the improved messaging technique can be used in a simple Person-To-Person messaging system. The Person-to-Person messaging system will allow persons to send messages for free by adding a single number prior to the mobile phone number of the target recipient. In this case, all UIN's will be the mobile phone number of a person (the recipient), for example 639179876543 while the AC will include the digits 63, for example the AC will be 463. The instruction given to end users will be "To send SMS for free, just type your message then send to 4 then the number of your friend. Ex. Type HELLO then send to 4639179876543."

Embodiments of the invention have been described with reference to the drawings and examples. However, modifications may be made falling within the scope of the invention as defined by the appended claims.

The invention claimed is:

1. A method of conveying information between a wireless communication device and a computer providing a messaging service, the method comprising:
   forming an address for the computer by combining an Access Code (AC) uniquely identifying the computer and a Unique Identification Code (UIC) signifying:
   (i) a prescribed action to be performed by the computer; and
   (ii) an entity that is the subject of the prescribed action, at least one character of the address being common to both the AC and the UIC,
   arranging the address such that said at least one common character is unified within the address such that a number of characters in the address is less than a total number of characters in the AC and the UIC,
   sending a message from the wireless communication device to said computer, the message including the address for the computer,
   receiving the message at the computer.

2. The method as claimed in claim 1, further comprising the step of:
   sending the message from the wireless communication device to a messaging computer, wherein the AC uniquely identifies the computer to the messaging computer which sends the message to the computer.

3. The method as claimed in claim 2, wherein the step of forming the address includes the sub-step of:
   positioning the at least one character in common at a portion of the address where the two codes overlap.

4. The method as claimed in claim 1 wherein the computer is a messaging computer and the method further comprising the steps of:
   uniquely identifying a messaging service provided by the messaging computer by reference to the AC; and
   identifying a client to which the message is to be sent by reference to the UIC.

5. The method as claimed in claim 4, wherein the step of forming the address includes the sub-step of:
   positioning the at least one character in common at a portion of the address where the two codes overlap.

6. The method as claimed in claim 1, wherein the step of forming the address includes the sub-step of:
   positioning the at least one character in common at a portion of the address where the two codes overlap.

7. A system for conveying information comprising:
   a wireless communication device; and
   a computer providing a messaging service, wherein the wireless communication device is adapted to send a message to said computer, the message including an address for the computer, and the system is adapted to correctly direct the message by reference to an address formed by combining an Access Code (AC) uniquely identifying the computer and a Unique Identification Code (UIC) signifying:
   (i) a prescribed action to be performed by the computer; and
   (ii) an entity that is the subject of the prescribed action; and wherein at least one character of the address is common to both the AC and the UIC and the address is arranged such that said at least one common character is unified within the address and that a number of characters in the address string is less than a total number of characters in the AC and the UIC.

8. The system as claimed in claim 7 further comprising a messaging computer, and wherein the AC uniquely identifies the computer to the messaging computer that sends the message to the computer.

9. The system as claimed in claim 8, wherein the address is formed by combining the AC and UIC as two overlapping sets of characters and the at least one character in common is positioned at a portion of the address where the two codes overlap.

10. The system as claimed in claim 7, wherein the computer is a messaging computer and the AC uniquely identifies a messaging service provided by the messaging computer and the UIC identifies a client to which the message is to be sent.

11. The system as claimed in claim 10, wherein the address is formed by combining the AC and UIC as two overlapping sets of characters and the at least one character in common is positioned at a portion of the address where the two codes overlap.

12. The system as claimed in claim 7, wherein the address is formed by combining the AC and UIC as two overlapping sets of characters and the at least one character in common is positioned at a portion of the address where the two codes overlap.

13. A computer providing a wireless communication device for use in a system for conveying information, the computer operable to receive a message sent by a wireless communication device by reference to an address of the computer formed by combining an Access Code (AC) uniquely identifying the computer and a Unique Identification Code (UIC) signifying:
   (i) a prescribed action to be performed by the computer; and
   (ii) an entity that is the subject of the prescribed action, at least one character of the address being common to both the AC and the UIC and where such address is further arranged such that said at least one common character is unified within the address such that a number of characters in the address is less than a total number of characters in the AC and the UIC, said message including the address.

14. A message for conveying information between a wireless communication device and a computer providing a messaging service, said message being created by the wireless communications device and including an address of the computer formed by combining an Access Code (AC) uniquely identifying the computer and a Unique Identification Code (UIC) signifying:
   (i) a prescribed action to be performed by the computer; and
   (ii) an entity that is the subject of the prescribed action, at least one character of the address being common to both the AC and the UIC and where such address is further arranged such that said at least one common character is unified within the address such that a number of characters in the address is less than a total number of characters in the AC and the UIC, said message being routed to the computer with reference to said address.

* * * * *